US012742642B2

(12) United States Patent
Woo et al.

(10) Patent No.: US 12,742,642 B2
(45) Date of Patent: Sep. 22, 2026

(54) ELECTRONIC DEVICE FOR CALIBRATING GEOMAGNETIC SENSOR, AND METHOD OF OPERATING ELECTRONIC DEVICE

(71) Applicant: SAMSUNG ELECTRONICS CO., LTD., Suwon-si (KR)

(72) Inventors: Junyoung Woo, Suwon-si (KR); Hansung Leem, Suwon-si (KR); Taeyoon Kim, Suwon-si (KR); Chaeman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 18/460,082

(22) Filed: Sep. 1, 2023

(65) Prior Publication Data

US 2023/0408255 A1 Dec. 21, 2023

Related U.S. Application Data

(63) Continuation of application No. PCT/KR2022/002818, filed on Feb. 25, 2022.

(30) Foreign Application Priority Data

Mar. 2, 2021 (KR) ........................ 10-2021-0027690

(51) Int. Cl.
*G01C 17/38* (2006.01)

(52) U.S. Cl.
CPC .................................... *G01C 17/38* (2013.01)

(58) Field of Classification Search
CPC ................................ G01C 17/30; G01C 17/38
See application file for complete search history.

(56) References Cited

U.S. PATENT DOCUMENTS 9,229,084 B2 1/2016 Tu
2004/0254727 A1* 12/2004 Ockerse ................. G01C 17/38 701/535

(Continued)

FOREIGN PATENT DOCUMENTS

JP 2017166895 A 9/2017
JP 6702392 B2 5/2020

(Continued)

OTHER PUBLICATIONS

International Search Report for PCT/KR2022/002818 mailed May 30, 2022, 4 pages.

(Continued)

*Primary Examiner* — Jennifer Bahls
(74) *Attorney, Agent, or Firm* — Nixon & Vanderhye P.C.

(57) ABSTRACT

An electronic device may include: a geomagnetic sensor; a motion sensor for sensing a signal associated with a motion of a user; and a processor operatively connected, directly or indirectly, to the geomagnetic sensor and the motion sensor, wherein the processor determines whether to perform calibration of the geomagnetic sensor based on a signal measured by the geomagnetic sensor; in response to the determination to perform the calibration, identifies the motion of the user based on motion data obtained from the motion sensor; based on the identified motion of the user, determines a parameter including a range of data to be used for calibrating the geomagnetic sensor among data obtained from the geomagnetic sensor; and calibrates the geomagnetic sensor based on data extracted based on the parameter. Other various embodiments are possible.

13 Claims, 10 Drawing Sheets

(56) References Cited

U.S. PATENT DOCUMENTS

2008/0051987 A1 2/2008 Okeya
2010/0312509 A1* 12/2010 Patel ...................... G01C 17/38 702/92
2012/0086438 A1 4/2012 Tu
2014/0200841 A1 7/2014 Choi et al.
2014/0297213 A1 10/2014 Lee
2015/0233714 A1 8/2015 Kim
2016/0341569 A1* 11/2016 Won ................... G01R 33/0035
2017/0176187 A1* 6/2017 Ishihama ............... G01C 21/08
2017/0343349 A1 11/2017 Han et al.
2018/0333057 A1 11/2018 Chowdhary et al.
2019/0195907 A1 6/2019 Nomura et al.
2020/0000414 A1* 1/2020 McCord ............... A61B 5/7267
2020/0142008 A1* 5/2020 Berkovich ......... G01R 33/0035

FOREIGN PATENT DOCUMENTS

KR 20060133078 A 12/2006
KR 20140093111 A 7/2014
KR 20140117120 A 10/2014
KR 20150055423 A 5/2015
KR 20150097260 A 8/2015

OTHER PUBLICATIONS

Korean Office Action dated Mar. 13, 2026 for KR Application No. 10-2021-0027690.

* cited by examiner

FIG. 7C

| Window A | Window A |
|---|---|
| Window - B | Window - B |

ELECTRONIC DEVICE FOR CALIBRATING GEOMAGNETIC SENSOR, AND METHOD OF OPERATING ELECTRONIC DEVICE

CROSS-REFERENCE TO RELATED APPLICATIONS

This application is a continuation of International Application No. PCT/KR2022/002818 filed on Feb. 25, 2022, designating the United States, in the Korean Intellectual Property Receiving Office, and claiming priority to KR Patent Application No. 10-2021-0027690 filed on Mar. 2, 2021, in the Korean Intellectual Property Office, the disclosures of all of which are hereby incorporated by reference herein in their entireties.

BACKGROUND

Field

Various example embodiments relate to an electronic device for calibrating a geomagnetic sensor and/or an operation method of an electronic device, for example an electronic device capable of calibrating the geomagnetic distortion because of external interference that may occur indoors and/or an operation method of an electronic device.

Description of Related Art

Recently, various technologies have been developed using sensors embedded in mobile devices. For example, technology is being developed to estimate a position, a stride length, and an azimuth using mobile devices when tracking indoor location. An example of a sensor embedded in a mobile device is a geomagnetic sensor that can measure the Earth's magnetic field for azimuth measurements.

A geomagnetic sensor is a sensor that detects geomagnetism by measuring a voltage value induced by a geomagnetism using a flux-gate. Geomagnetic sensors can be implemented in two or three axes. In this case, since the geomagnetic output value calculated by each axial geomagnetic sensor depends on the surrounding magnetic field magnitude, it is common to perform normalization to map the geomagnetic output value within a predetermined range.

Geomagnetic sensors are highly susceptible to external interference. The geomagnetic sensor is affected by distortion depending on the surrounding structure and geomagnetic distribution situation, and the main causes are the influence of the surrounding steel structure and the influence on the tilt of the geomagnetic sensor. The steel structure affects the strength of the magnetic field received by the geomagnetic sensor, resulting in a change in the values measured from the sensor.

Typical external interferences include soft iron distortion and hard iron distortion. Soft iron distortion is a distortion in which the scale of the geomagnetic sensor value changes, and the shape of the circle represented by the data of the geomagnetic sensor is distorted. Hard iron distortion is a distortion in which the offset of the geomagnetic sensor value changes and the center point of the circle represented by the data of the geomagnetic sensor deviates from the origin. In general, the effect caused by soft iron distortion is not large, so hard iron distortion is mainly considered for error correction of geomagnetic sensors.

Hard iron distortion is caused by an object with a magnetic field. For example, hard iron distortion may occur by a speaker, a camera, or a vibrator included in a mobile device. As such, distortion according to the material included in the mobile device can be calibrated because a constant magnetic field is generated.

However, hard iron distortion caused by objects outside the mobile device is unpredictable and requires adaptive calibration.

In a normal geomagnetic sensor, when the Z-axis of the electronic device is placed perpendicular to the ground surface and the electronic device rotates the Z-axis along the X-Y plane, the data measured by the geomagnetic sensor appears in the form of a circle centered on (0,0) of the X-Y plane. However, in a geomagnetic sensor with hard iron distortion, when the electronic device rotates the Z-axis, the data measured by the geomagnetic sensor appears in the form of a circle centered on a value other than (0,0).

Thus, if the hard iron distortion is not removed, the geomagnetic sensor will measure a magnetic field that is different from the actual magnetic field, and the electronic device may provide inaccurate information.

SUMMARY

In a room, a geomagnetic sensor can be distorted by interference from the surrounding structures and various objects in the room.

Various example embodiments may provide techniques for calibrating distorted geomagnetic sensor values based on the motion of the user.

An electronic device of various example embodiments may obtain data related to motion by various types of motion sensors and/or combinations of motion sensors included in the electronic device, analyze it, and identify the motion of the user who grips the electronic device. The electronic device may determine the parameters for calibrating the geomagnetic sensor based on the motion of the identified user and may perform geomagnetic sensor calibration by extracting data to be used for calibration according to the determined parameters.

In this way, the example geomagnetic sensor may be calibrated by the user's daily motion, and providing accurate data to the user even under normal circumstances will be a technical challenge for manufacturers to solve.

Technical problems to be solved in the present document are not limited to the aforementioned technical problems, and other technical problems not described above may be easily understood from the following description by a person having ordinary knowledge in the art to which the disclosure pertains.

The electronic device according to various example embodiments may comprise: a geomagnetic sensor; a motion sensor for sensing a signal associated with a motion of a user; and a processor operatively connected to the geomagnetic sensor and the motion sensor, wherein the processor determines whether to perform calibration of the geomagnetic sensor based on a signal measured by the geomagnetic sensor; in response to the determination to perform the calibration, identifies the motion of the user based on motion data obtained from the motion sensor; based on the identified motion of the user, determines a parameter including a range of data to be used for calibrating the geomagnetic sensor among data obtained from the geomagnetic sensor; and calibrates the geomagnetic sensor based on data extracted based on the parameter.

The operation method of the electronic device according to the various example embodiments may comprise: determining whether to perform calibration of the geomagnetic sensor based on the signal measured by the geomagnetic sensor; identifying the user's motion based on the motion data obtained from the motion sensor in response to the determination to perform the calibration; determining a parameter including a range of data to be used to calibrate the geomagnetic sensor among the data obtained from the geomagnetic sensor based on the motion of the identified user; and calibrating the geomagnetic sensor based on the data extracted based on the parameters.

Even in indoor environments where geomagnetic distortion occurs, electronic devices can measure accurate geomagnetic values.

In addition, an example electronic device can provide accurate data to the user as it measures the accurate geomagnetic value.

In addition, an example electronic device can calibrate the geomagnetic sensor even if the user performs a daily motion.

In addition, an example electronic device can calibrate the geomagnetic sensor without instructing the user to perform a specific motion.

In addition, by detecting that the electronic device is within a designated area of the indoors and initiating the calibration of the geomagnetic sensor, an example electronic device can save on/reduce current consumption.

In addition, when an example electronic device performs a calibration operation, an accurate correction operation can be performed by using the geomagnetic data to which filtering and parameter are applied in the calibration operation.

BRIEF DESCRIPTION OF DRAWINGS

In connection with the description of the drawings, the same or similar reference numerals may be used for the same or similar elements. Other aspects, features and advantages according to specific example embodiments will become more apparent from the accompanying drawings and corresponding descriptions in association.

FIG. 7C is a diagram illustrating an example in which a processor calibrates a geomagnetic sensor according to various example embodiments.

DETAILED DESCRIPTION

Figure 1:
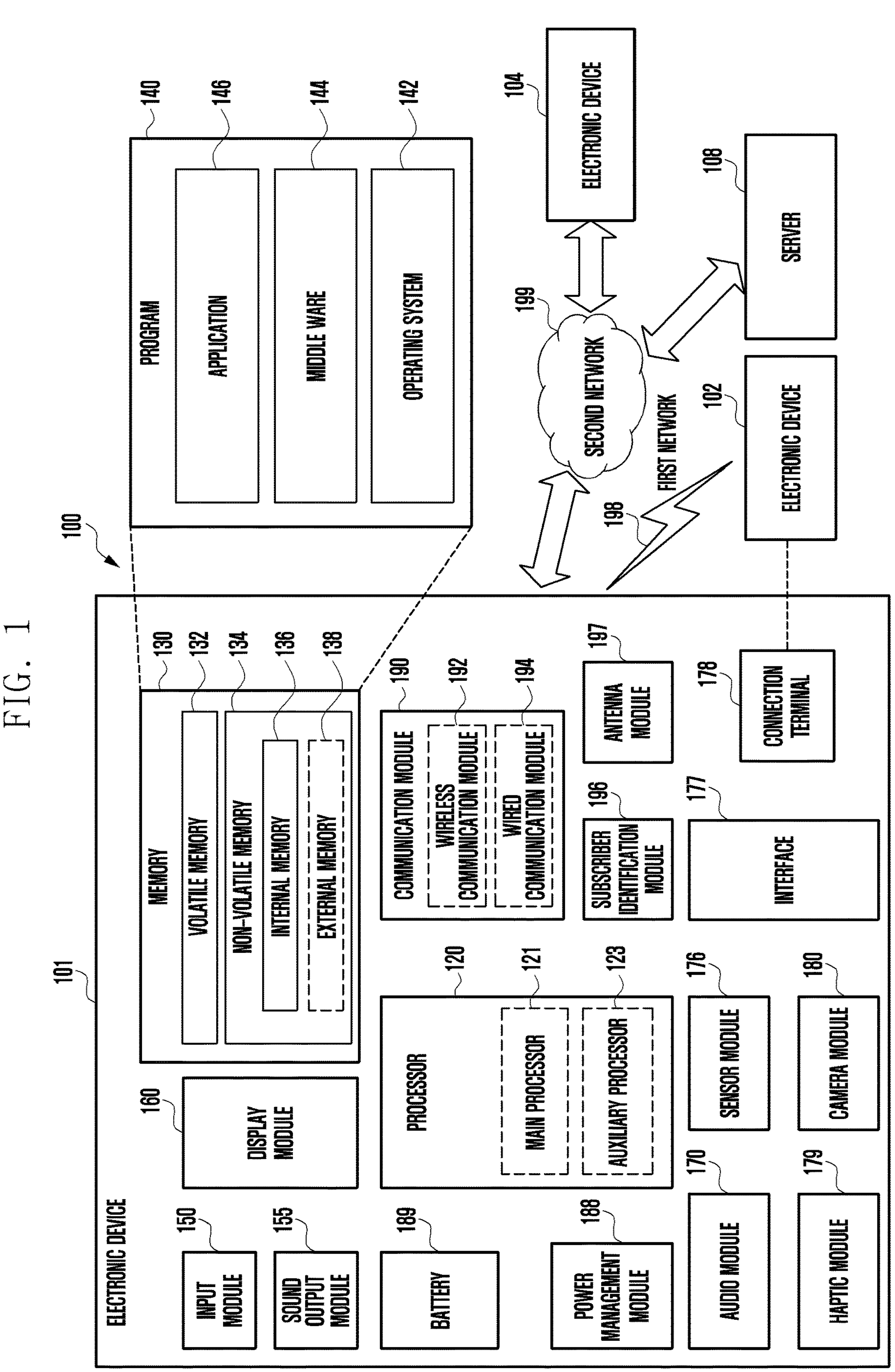
FIG. 1 is a block diagram of an electronic device in a network environment according to various example embodiments.

FIG. 1 is a block diagram illustrating an electronic device 101 in a network environment 100 according to various embodiments. With reference to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, For example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, For example, software (e.g., the program 140) and input data or output data for a command related thererto. The memory 130 may include the volatile memory 132 or the non-volatile memory 134.

The program 140 may be stored in the memory 130 as software, and may include, For example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, For example, a microphone, a mouse, a keyboard, a key (e.g., a button), or a digital pen (e.g., a stylus pen).

The sound output module 155 may output sound signals to the outside of the electronic device 101. The sound output module 155 may include, For example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, For example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, For example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, For example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, For example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, For example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, For example, a power management integrated circuit (PMIC).

The battery 189 may supply power to at least one component of the electronic device 101. According to an embodiment, the battery 189 may include, For example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, For example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment, commands or data may be transmitted or received between the electronic device 101 and the external electronic device 104 via the server 108 coupled with the second network 199. Each of the electronic device 102 or 104 may be a device of a same type as, or a different type, from the electronic device 101. According to an embodiment, all or some of operations to be executed at the electronic device 101 may be executed at one or more of the external electronic device 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The electronic device 101 may provide the outcome, with or without further processing of the outcome, as at least part of a reply to the request. To that end, a cloud computing, distributed computing, mobile edge computing (MEC), or client-server computing technology may be used, For example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
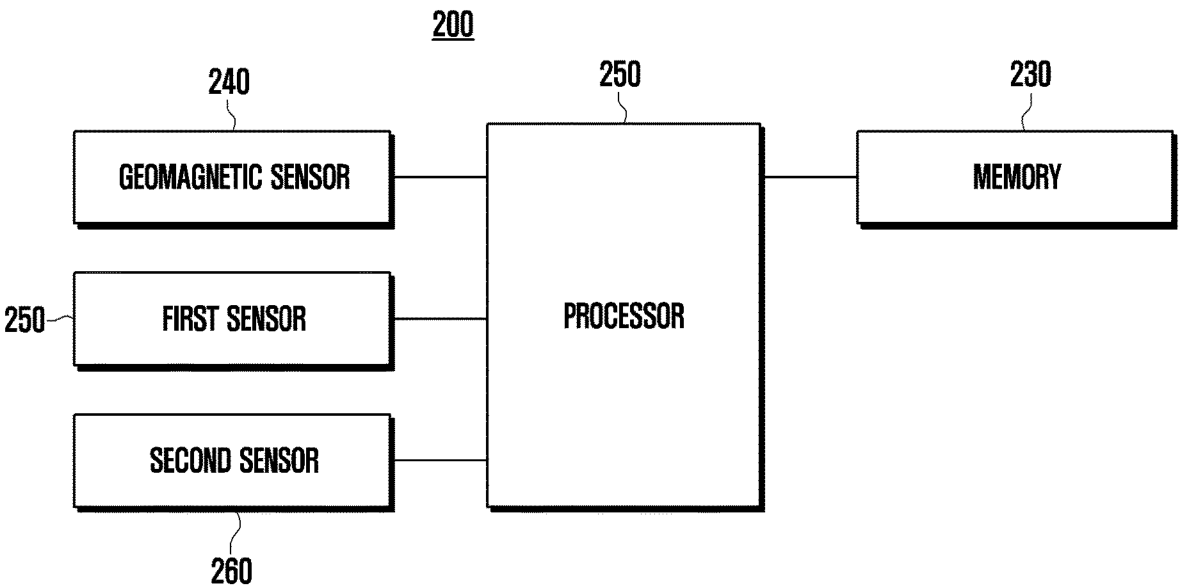
FIG. 2 is a block diagram of an electronic device according to various example embodiments.

FIG. 2 is a block diagram of an electronic device according to various example embodiments.

With reference to FIG. 2, the electronic device 200 (e.g., the electronic device 101 of FIG. 1) may include a processor 220 (e.g., the processor 120 of FIG. 1), a memory 230 (e.g., the memory 130 of FIG. 1), a geomagnetic sensor 240, a first sensor 250, and/or a second sensor 260. The components included in FIG. 2 relate to a portion of the configurations included in the electronic device 200, and the electronic device 200 may also include various other components as shown in FIG. 1.

According to an embodiment, the first sensor 250 may measure a signal associated with the position of the electronic device 200. According to an embodiment, the first sensor 250 may include at least one of a sensor (e.g., a communication module comprising communication circuitry) for measuring a communication signal, a barometric pressure sensor, and an altitude sensor. For example, the first sensor 250 may measure at least one of a communication signal such as a cellular signal, a Wifi signal, and a Bluetooth signal, an altitude, and a barometric pressure, and it may obtain related data (e.g., a signal strength, a signal ID) based on the measured signal.

According to an embodiment, the geomagnetic sensor 240, as a sensor that measures the magnetic force (geomagnetism) of the Earth, may include a three-axis geomagnetic sensor capable of measuring the geomagnetism (Mx, My, Mz) of each of the x-axis, y-axis, and z-axis. According to an embodiment, the geomagnetic sensor 240 may include various types of sensors, such as a Hall sensor, a magneto resistance (MR) sensor, and a magneto impedence (MI) sensor.

According to an embodiment, the second sensor 260 may obtain motion data by measuring a signal related to the motion of a user using the electronic device 200. According to an embodiment, the second sensor 260 may include at least one of a gravity sensor, an acceleration sensor, and a gyro sensor. For example, the second sensor 260 may measure at least one of the direction of gravity applied to the electronic device 200, the acceleration by axis of the electronic device 200, and the angular velocity, and it may obtain motion data based on the measured signal. For example, the motion data may include a value of a signal measured by the second sensor 260 and/or a combined form of a signal (e.g., root mean square (RMS), sum of absolute values of each axis, difference between the absolute value of the current value and the absolute value of the immediately preceding value).

The memory 230 may temporarily or non-temporarily store a model learned with reference data and/or a motion data set associated with a designated area.

According to an embodiment, the reference data, as data that may indicate a feature of a designated area, may include various information related to a signal that can be measured in a designated area. For example, the reference data may include at least one of a specified signal strength (e.g., a reception strength of a cellular signal, a reception strength of a WiFi signal, a reception strength of a Bluetooth signal), an ID of a specified signal (e.g., an ID of an AP of a Wifi signal, an ID of a Bluetooth device), a specified altitude, and a specified barometric pressure. According to an embodiment, the reference data may be classified by a designated area and stored in the memory 230.

According to an embodiment, the learned model may be an artificial intelligence model learned with a motion data set to analyze the motion data. For example, the learned model may include various types of neural network models, such as convolution neural networks (CNNs) models and/or recurrent neural network (RNN) models learned with motion data sets.

The processor 220 may process various operations based on data obtained from the geomagnetic sensor 240, the first sensor 250, and/or the second sensor 260.

Figure 3:
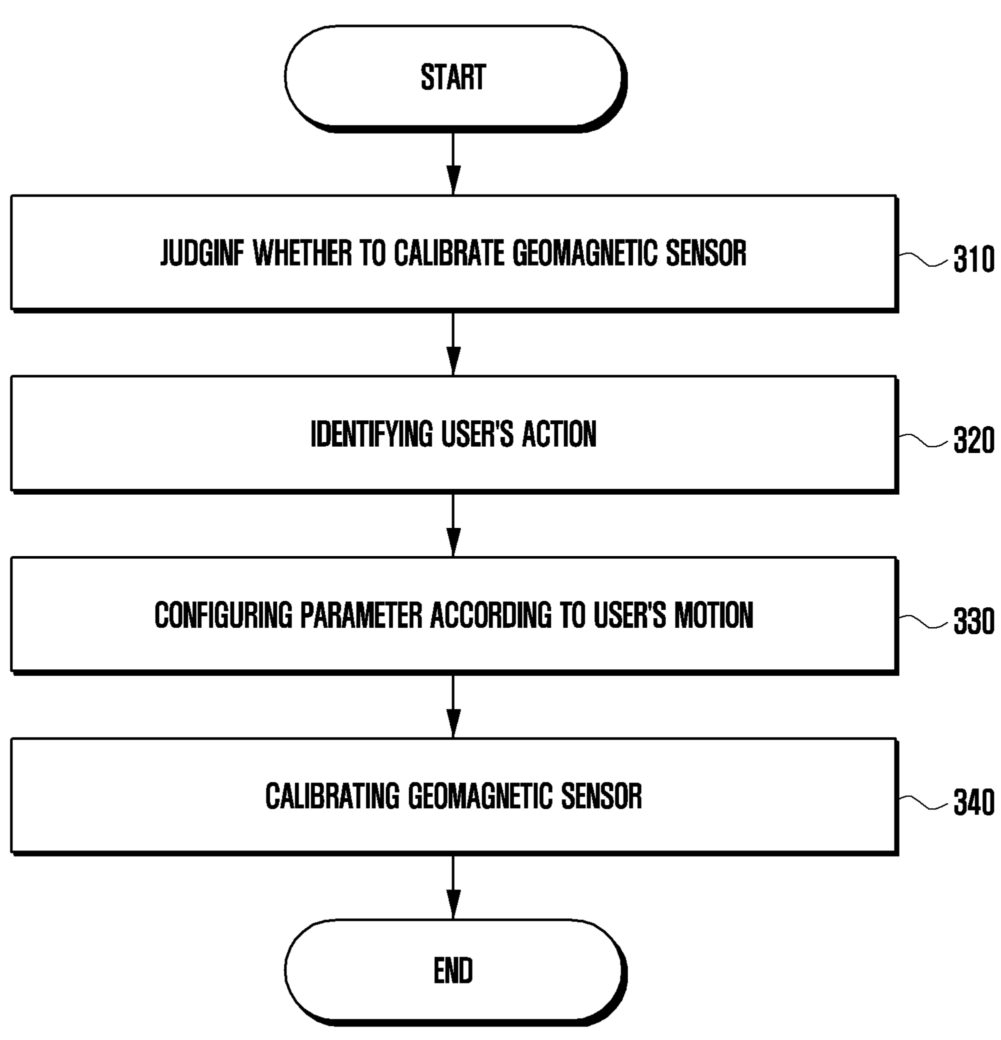
FIG. 3 is a flowchart illustrating a method for which a processor calibrates a geomagnetic sensor according to various example embodiments.

FIG. 3 is a flowchart illustrating a method in which a processor (e.g., the processor 220 of FIG. 2) calibrates a geomagnetic sensor (e.g., the geomagnetic sensor 240 of FIG. 2) according to various example embodiments.

According to various embodiments, the processor 220 may judge whether calibration of the geomagnetic sensor 240 is required in operation 310.

According to various embodiments, the processor 220 may compare the reference data with the data of the signal measured by the first sensor (e.g., the first sensor 250 of FIG. 2) and judge whether the electronic device 200 is within a designated area.

According to an embodiment, the reference data may include various information related to a signal that can be measured in a designated area as data that may indicate a feature of a designated area. For example, the reference data may include at least one of a specified signal strength (e.g., a reception strength of a cellular signal, a reception strength of a WiFi signal, a reception strength of a Bluetooth signal), an ID of a specified signal (e.g., an ID of an AP of a Wifi signal, a Bluetooth ID), a specified altitude, and a specified barometric pressure. According to an embodiment, the reference data may be classified by a designated area and stored in the memory 230.

According to an embodiment, the processor 220 may store data of a signal measured in a designated area as reference data in the memory 230. For example, when the electronic device 200 is located in a designated area, information on a signal related to a location that can be measured may be added to the reference data of the designated area. According to an embodiment, the first sensor 250 may measure a signal associated with the position of the electronic device 200. According to an embodiment, the first sensor 250 may include at least one of a sensor (e.g., a communication module) for measuring a communication signal, a barometric pressure sensor, and an altitude sensor. For example, the first sensor 250 may measure at least one of a communication signal such as a cellular signal, a Wifi signal, and a Bluetooth signal, an altitude, and a barometric pressure, and it may obtain related data (e.g., a signal strength, a signal ID) based on the measured signal.

According to an embodiment, the processor 220 may compare the reference data with the data of the signal measured by the first sensor. For example, the processor 220 may calculate the degree of agreement of the data of the reference data and the signal measured by the first sensor.

According to an embodiment, the processor 220 may judge whether the electronic device 200 is within a designated area based on the result of comparing the reference data with the data of the signal measured by the first sensor. For example, the processor 220 may judge that the electronic device 200 is within the designated area in response to the fact that the result of calculating the degree of agreement of the data of the reference data and the signal measured by the first sensor is greater than or equal to the specified value.

According to an embodiment, the processor 220 may perform an operation to judge whether calibration of the geomagnetic sensor 240 is required in response to the judgment that the electronic device 200 is within a designated area. According to an embodiment, after judging that the electronic device is within the designated area and determining that calibration of the geomagnetic sensor 240 is required, the processor 220 may perform an operation to calibrate the geomagnetic sensor 240 in response to the judgment that the electronic device 200 is out of the designated area. According to an embodiment, the processor 220 may perform an operation to calibrate the geomagnetic sensor 240 for a period of time when the time away from the electronic device 200 does not exceed a specified time.

According to another embodiment, the processor 220 may perform an operation to judge whether calibration of the geomagnetic sensor 240 is required without judging whether the electronic device 200 is within a designated area. For example, the processor 220 may periodically and/or aperiodically perform an operation to judge whether calibration of the geomagnetic sensor 240 is required.

According to various embodiments, the processor 220 may judge whether the geomagnetic sensor 240 requires calibration by determining whether the magnitude of the geomagnetic signal measured by the geomagnetic sensor 240 is greater than or equal to the specified value.

According to an embodiment, the geomagnetic sensor 240, as a sensor that measures the magnetic force (geomagnetism) of the Earth, may include a three-axis geomagnetic sensor capable of measuring the geomagnetism (Mx, My, Mz) of each of the x-axis, y-axis, and z-axis. According to an embodiment, the geomagnetic sensor 240 may include various types of sensors, such as a Hall sensor, a magneto resistance (MR) sensor, and a magneto impedance (MI) sensor.

According to an embodiment, the processor 220 may calculate the magnitude of the three-axis geomagnetic signal (Mx, My, Mz) measured by the geomagnetic sensor 240 and determine whether to perform calibration of the geomagnetic sensor 240 using Equation 1.

$$(^{*}78)\sqrt{M_x^2+M_y^2+M_z^2} \geq threshold(constant) \quad \text{[Equation 1]}$$

According to various embodiments, the processor 220 may judge that calibration of the geomagnetic sensor 240 is required in response to the magnitude of the signal measured by the geomagnetic sensor 240 being greater than or equal to a specified threshold. For example, the specified threshold may be a value determined to judge the case that the strength of the geomagnetic signal measured in a general case exceeds the range. For example, when the geomagnetic sensor 240 does not require calibration of the geomagnetic sensor 240, the strength of the measured geomagnetic signal may be within a specified range. For example, the strength of the geomagnetic signal measured by the geomagnetic sensor 240 may be a value in the first range (e.g., 30~80 μT). The processor 220 may judge that calibration of the geomagnetic sensor 240 is required in response to the strength of the geomagnetic signal measured by the geomagnetic sensor 240 exceeding a specified value (e.g., 80 μT).

According to various example embodiments, the processor 220 may be configured to perform a series of operations for calibration of the geomagnetic sensor 240 as calibration of the geomagnetic sensor 240 is required. The processor 220 may perform calibration of the geomagnetic sensor 240 based on at least portion of the data collected by the geomagnetic sensor 240. When the geomagnetic sensor 240 collects data, the processor 220 may select data to be used to perform calibration of the geomagnetic sensor 240 according to the posture information of the electronic device 200.

According to various embodiments, the processor 220 may identify the user's motion in operation 320.

According to various embodiments, the processor 220 may obtain motion data from a second sensor (e.g., the second sensor 260 of FIG. 2).

According to an embodiment, the second sensor 260 may obtain motion data by measuring a signal related to the posture of the electronic device 200 that is changed by the motion of a user using the electronic device 200. According to an embodiment, the second sensor 260 may include at least one of a gravity sensor, an acceleration sensor, and a gyro sensor. For example, the second sensor 260 may measure at least one of the direction of gravity applied to the electronic device 200, the acceleration by axis of the electronic device 200, and the angular velocity, and it may obtain motion data based on the measured signal. For example, the motion data may include a value of a signal measured by the second sensor 260 and/or a combined form of a signal (e.g., root mean square (RMS), sum of absolute values of each axis, difference between the absolute value of the current value and the absolute value of the immediately preceding value).

According to various embodiments, the processor 220 may identify the user's motion based on the motion data. According to an embodiment, the processor 220 may input the motion data into the learned model and identify the user's motion.

According to an embodiment, the processor 220 may analyze the motion data using an artificial intelligence model learned with the motion data set stored in the memory 230. For example, the processor 220 may input motion data based on the signal measured by the second sensor 260 to the artificial intelligence model learned with the motion data set, obtain the feature value of the input data, and extract the feature value corresponding to the classification of the motion based on the obtained feature value. For example, the processor 220 may analyze motion data based on signals measured by the second sensor 260 using various types of neural network models, such as convolution neural networks (CNNs) models and/or recurrent neural networks (RNNs) models.

According to an embodiment, the processor 220 may identify the user's motion based on the output value of the learned model. For example, the user's motion may include various types of user's motion holding the electronic device 200 such as a walking motion of holding and swinging the electronic device 200 in his hand, a walking motion of a user walking with the electronic device 200 in his or her pants pocket, and a walking motion of a user walking with the electronic device 200 in a bag.

According to an embodiment, the processor 220 may match the output value with the corresponding user motion. For example, the processor 220 may store in the memory 230 by matching the level corresponding to the classification of the motion and may classify the motion according to the output value by matching the output value of the learned model with the level.

According to an embodiment, the processor 220 may identify real-time motion by analyzing motion data based on a signal measured in real time by the second sensor 260. For example, the processor 220 may collect a signal measured by the second sensor 260 in real time and input it into the learned model in real time to identify the user's motion over time.

According to various embodiments, the processor 220 may configure parameters to be used for calibration of the geomagnetic sensor 240 according to the motion of the identified user in operation 330.

For example, the processor 220 may determine the parameters to be used for geomagnetic sensor 240 calibration differently depending on the motion (e.g., armswing motion while holding the electronic device, walking with the electronic device in the pocket of the pants).

According to various example embodiments, the parameter may be information for selecting data to be used for calibration of the geomagnetic sensor 240. According to an embodiment, the parameter may include a range of signal strength determined based on data to be used for calibration of the geomagnetic sensor 240.

According to an embodiment, the parameter may include a range of data to be used to calibrate the geomagnetic sensor 240 among data based on the signal measured by the geomagnetic sensor 240.

The signal measured by the geomagnetic sensor 240 may be expressed as each geomagnetic value of the three axes. For example, the signal measured by the geomagnetic sensor 240 may be expressed as x-axis geomagnetic value (Mx), y-axis geomagnetic value (My), z-axis geomagnetic value (Mz). When a set of data based on the signal measured by the geomagnetic sensor 240 is displayed on a three-dimensional coordinate system, it may be expressed in the form of a sphere. Since the geomagnetic sensor 240 may cause various errors when measuring the signal, the processor 220 may determine the range of data to be used for calibration of the geomagnetic sensor 240 from the data obtained by the geomagnetic sensor 240 to exclude the data in which the error occurred.

According to an embodiment, the processor 220 may determine the data to be used for calibration of the geomagnetic sensor 240 according to the strength of the geomagnetic signal.

For geomagnetic data that can be expressed as (Mx, My, Mz), the magnitude of the geomagnetic data (strength of the geomagnetic signal) may be calculated using the equation of $$\sqrt{M_x^2+M_y^2+M_z^2}.$$

According to an embodiment, the processor 220 may calculate the size of the obtained geomagnetic data respectively, and the geomagnetic data within a specified range of the size of the calculated geomagnetic data may be used for calibration of the geomagnetic sensor 240.

In general, the strength of the Earth's magnetic field, which is measured outdoors, may be measured differently depending on the region. For example, the strength of the Earth's magnetic field measured in Korea may be measured in about 50 μT (micro Tesla). On the other hand, the strength of the Earth's magnetic field measured indoors may be measured in the first range (e.g., 30-80 μT) because of the occurrence of distortion. Therefore, in a general case, when the strength of the signal measured by the geomagnetic sensor 240 is in the first range (e.g., 30-80 μT), the data may be judged as data that can be used for calibration of the geomagnetic sensor 240.

According to an embodiment, the processor 220 may determine the range of strength of the geomagnetic signal corresponding to the data to be used for calibration of the geomagnetic sensor 240 according to the motion of the user.

For example, when the user grips the electronic device 200 and performs an armswing motion, the processor 220 may determine data corresponding to a geomagnetic signal having a strength of a second range (e.g., 40 μT to 70 μT) as data to be used for calibration of the geomagnetic sensor 240. As another example, when the user puts the electronic device 200 in his or her pants pocket and makes a walking motion, the processor 220 may determine the data corresponding to a geomagnetic signal having a third range (e.g., 20 μT to 80 μT) as data to be used for calibration of the geomagnetic sensor 240.

According to various embodiments, the processor 220 may calibrate the geomagnetic sensor 240 based on the geomagnetic data extracted based on the parameters in operation 340.

According to various embodiments, the processor 220 may filter the geomagnetic data obtained through the geomagnetic sensor 240. According to an embodiment, the processor 220 may process data by applying a filter (e.g., Kalman filter, a lowpass filter, and/or moving average) to the geomagnetic data obtained through the geomagnetic sensor 240.

According to an embodiment, the processor 220 may calculate the radius of the sphere in which the set of data is shaped to determine the reliability of the filtered data. For example, processor 220 may arrange a set of filtered data on a three-dimensional coordinate system and calculate the radius of a sphere formed by the arranged data. According to an embodiment, the processor 220 may determine that the filtered data is unreliable if the radius of the sphere is greater than or equal to the first value and/or less than or equal to the second value.

According to an embodiment, the processor 220 may perform an operation to calibrate the geomagnetic sensor 240 using the filtered data in response to the determination that the filtered data is reliable.

According to various embodiments, the processor 220 may generate feature data based on the extracted geomagnetic data based on the determined parameters and calibrate the geomagnetic sensor 240 based on the feature data.

According to an embodiment, the processor 220 may determine the geomagnetic data to be used for calibration of the geomagnetic sensor 240 based on a parameter including the strength range of the geomagnetism. For example, the processor 220 may extract geomagnetic data of which the strength of the geomagnetic signal is included in a specified range and use the extracted data for calibration of the geomagnetic sensor 240.

According to an embodiment, the processor 220 may generate feature data representative of the geomagnetic data measured by the geomagnetic sensor 240 using the extracted geomagnetic data based on the filtered data and the determined parameters. For example, the feature data may be data corresponding to the center point of the sphere when the geomagnetic data forms the shape of a sphere on a three-dimensional coordinate system. For example, the processor 220 may extract data within the range of the strength of the geomagnetic signal corresponding to the determined parameter from the filtered data. The processor 220 may arrange the extracted data on a three-dimensional coordinate system and generate the center points (x1, y1, z1) of the sphere formed by the arranged data as feature data.

According to an embodiment, the processor 220 may calibrate the geomagnetic sensor 240 based on the feature data. For example, the processor 220 may calculate a calibration formula (e.g., x'=x−x0, y'=y−y0, z'=z−z0) to be (0, 0, 0) that can be expressed as (x0, y0, z0).

According to an embodiment, the processor 220 may calibrate the geomagnetic sensor 240 based on the calculated calibration formula. For example, the processor 220 may change the settings of the geomagnetic sensor 240 so that the geomagnetic sensor 240 outputs data based on the signal by applying a calculated calibration formula when measuring the geomagnetic signal.

Figure 4:
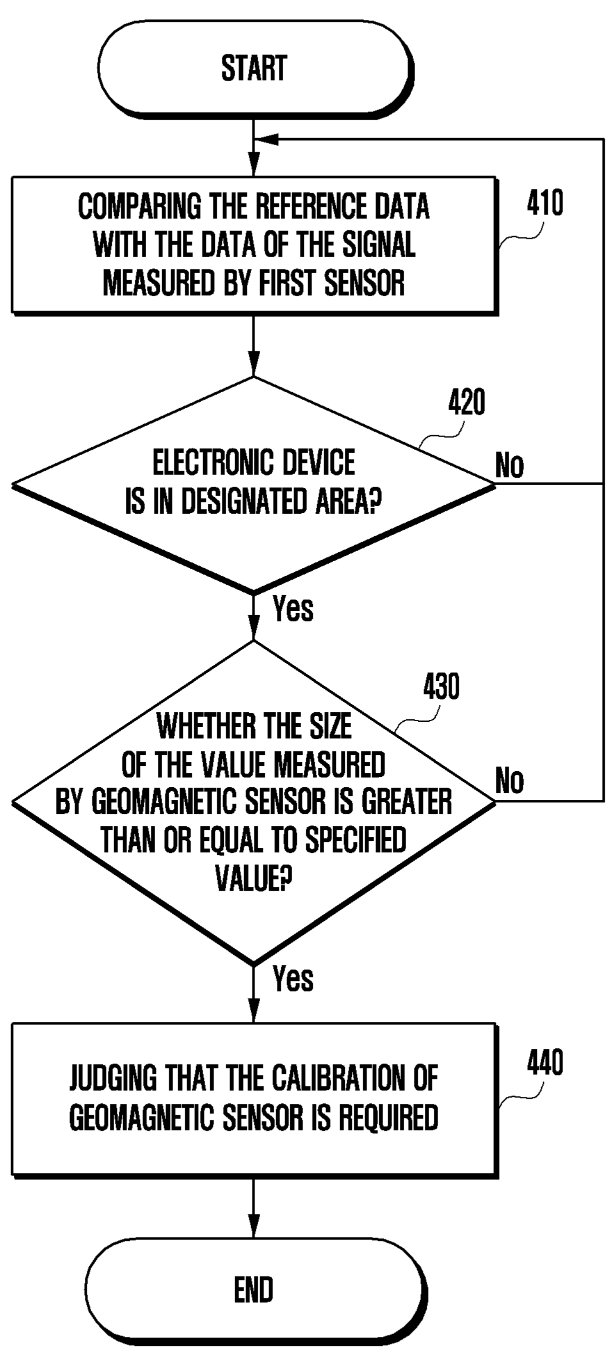
FIG. 4 is a flowchart illustrating a method of judging whether a processor according to various example embodiments requires calibration of a geomagnetic sensor.

FIG. 4 is a flowchart illustrating a method of determining whether a processor (e.g., the processor 220 of FIG. 2) according to various example embodiments requires calibration of the geomagnetic sensor 240.

According to various embodiments, the processor 220 may compare the reference data and the data of the signal measured by the first sensor (e.g., the first sensor 250 in FIG. 2) in operation 410.

According to an embodiment, the reference data, as data that may indicate a feature of a designated area, may include various information related to a signal that can be measured in a designated area. For example, the reference data may include a specified signal strength (e.g., a reception strength of a cellular signal, a reception strength of a WiFi signal, a reception strength of a Bluetooth signal), an ID of a specified signal (e.g., an ID of an AP of a Wifi signal, a Bluetooth ID), a specified altitude, and a specified barometric pressure. According to an embodiment, the reference data may be classified by a designated area and stored in the memory 230.

According to an embodiment, the processor 220 may store data of a signal measured in a designated area as reference data in the memory 230. For example, when the electronic device 200 is located in a designated area, information on a signal related to a location that can be measured may be added to the reference data of the designated area.

According to an embodiment, the first sensor 250 may measure a signal associated with the position of the electronic device 200. According to an embodiment, the first sensor 250 may include at least one of a sensor (e.g., a communication module) for measuring a communication signal, a barometric pressure sensor, and an altitude sensor. For example, the first sensor 250 may measure at least one of a communication signal such as a cellular signal, a Wifi signal, and a Bluetooth signal, an altitude, and a barometric pressure, and it may obtain related data (e.g., a signal strength, a signal ID) based on the measured signal.

According to an embodiment, the processor 220 may compare the reference data with the data of the signal measured by the first sensor. For example, the processor 220 may calculate the degree of agreement of the data of the reference data and the signal measured by the first sensor.

According to various embodiments, the processor 220 may determine whether the electronic device 200 is within the designated area in operation 420.

According to an embodiment, the processor 220 may judge whether the electronic device 200 is within a designated area based on the result of comparing the reference data with the data of the signal measured by the first sensor. For example, the processor 220 may judge that the electronic device 200 is within the designated area in response to the result of calculating the degree of agreement of the data of the reference data and the signal measured by the first sensor is greater than or equal to the specified value.

According to various embodiments, the processor 220 may reperform operation 410 in response to the judgement that the electronic device 200 is not within the designated area (e.g., operation 420—No).

According to various embodiments, the processor 220 may judge whether the size of the geomagnetic signal measured by the geomagnetic sensor 240 is greater than or equal to the specified value in operation 430 in response to the judgement that the electronic device 200 is within a designated area (e.g., operation 420—Yes).

According to an embodiment, the geomagnetic sensor 240 may include a three-axis geomagnetic sensor capable of measuring the geomagnetism (Mx, My, Mz) of each of the x-axis, y-axis, and z-axis as a sensor that measures the magnetic force (geomagnetism) of the Earth. According to an embodiment, the geomagnetic sensor 240 may include various types of sensors, such as a Hall sensor, a magneto resistance (MR) sensor, and a magneto impedance (MI) sensor.

According to an embodiment, the processor 220 may calculate the magnitude of the three-axis geomagnetic signal (Mx, My, Mz) measured by the geomagnetic sensor 240 and determine whether to perform calibration of the geomagnetic sensor 240 using Equation 1.

According to various embodiments, the processor 220 may reperform operation 410 in response to the magnitude of the signal measured by the geomagnetic sensor 240 being less than the specified value (e.g., operation 430—No).

According to various embodiments, the processor 220 may judge that calibration of the geomagnetic sensor 240 is required in operation 440 in response to the fact that the size of the signal measured by the geomagnetic sensor 240 is greater than or equal to the specified value (e.g., operation 430—Yes).

For example, the specified value may be a value decided to judge the case that the strength of the geomagnetic signal measured in a general case exceeds the range. For example, when the geomagnetic sensor 240 does not require calibration of the geomagnetic sensor 240, the strength of the measured geomagnetic signal may be within a specified range. For example, the strength of the geomagnetic signal measured by the geomagnetic sensor 240 may be a value in the first range (e.g., 30~80 μT). The processor 220 may judge that calibration of the geomagnetic sensor 240 is required in response to the strength of the geomagnetic signal measured by the geomagnetic sensor 240 exceeding a specified value (e.g., 80 μT).

Figure 5A:
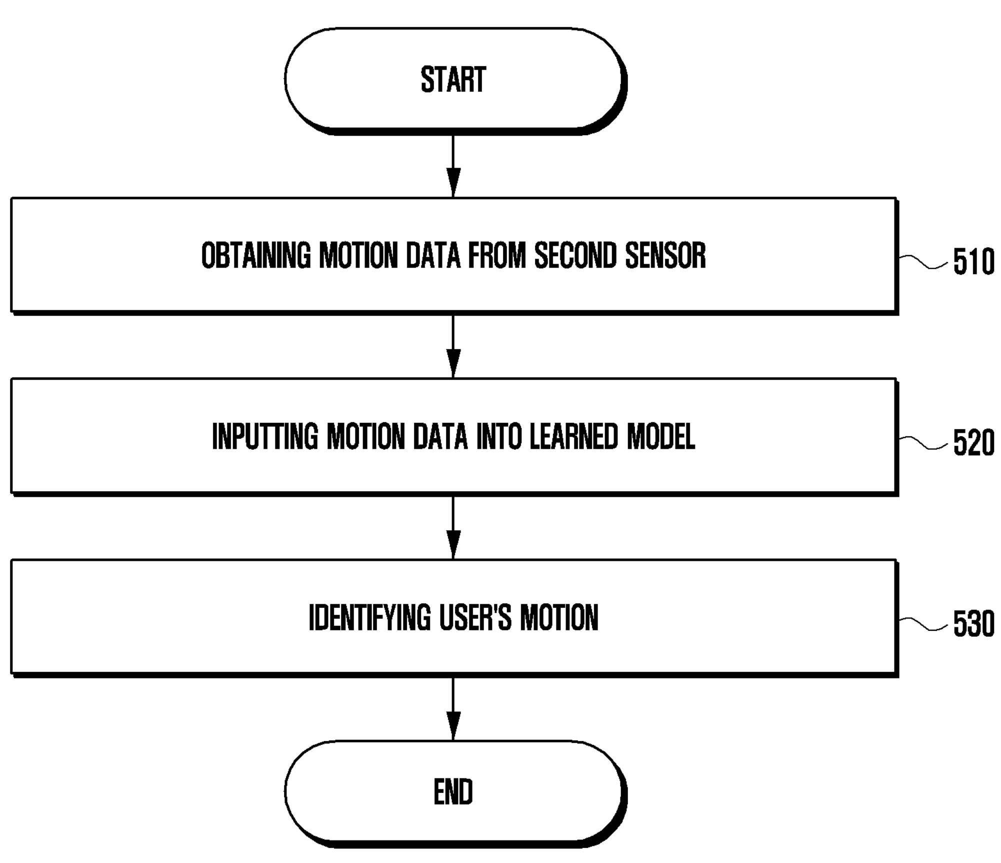
FIG. 5A is a flowchart illustrating a method for identifying the motion of a user by a processor according to various example embodiments.

According to an embodiment, the processor 220 may perform an operation according to the operation 320 of FIG. 3 and/or the flow diagram of FIG. 5*a* in response to the geomagnetic sensor 240 judging that calibration is required.

FIG. 5*a* is a flowchart illustrating a method of identifying the motion of a user by a processor (e.g., the processor 220 of FIG. 2) according to various example embodiments.

According to various embodiments, the processor 220 may obtain motion data from a second sensor (e.g., the second sensor 260 of FIG. 2) in operation 510.

According to an embodiment, the second sensor 260 may obtain motion data by measuring a signal related to the posture of the electronic device 200 that is changed by the motion of a user using the electronic device 200. According to an embodiment, the second sensor 260 may include at least one of a gravity sensor, an acceleration sensor, and a gyro sensor. For example, the second sensor 260 may measure at least one of the direction of gravity applied to the electronic device 200, the acceleration by axis of the electronic device 200, and the angular velocity, and it may obtain motion data based on the measured signal. For example, the motion data may include a value of a signal measured by the second sensor 260 and/or a combined form of a signal (e.g., root mean square (RMS), sum of absolute values of each axis, difference between the absolute value of the current value and the absolute value of the immediately preceding value).

According to various embodiments, the processor 220 may input the motion data to the learned model in operation 520.

According to various embodiments, the processor 220 may identify the user's motion based on the motion data.

According to an embodiment, the processor 220 may analyze the motion data using an artificial intelligence model learned with the motion data set stored in the memory 230. For example, the processor 220 may input motion data based on the signal measured by the second sensor 260 to the artificial intelligence model learned with the motion data set, obtain the feature value of the input data, and extract the feature value corresponding to the classification of the motion based on the obtained feature value. For example, the processor 220 may use various types of neural network models, such as convolution neural networks (CNNs) models and/or recurrent neural networks (RNNs) models and analyze motion data based on signals measured by the second sensor 260.

According to various embodiments, the processor 220 may identify the user's motion in operation 530.

According to an embodiment, the processor 220 may identify the user's motion based on the output of the learned model obtained in operation 520. For example, the user's motion may include various types of user's motion holding the electronic device 200 such as a walking motion of holding and swinging the electronic device 200 in his hand, a walking motion of a user walking with the electronic device 200 in his or her pants pocket, and a walking motion of a user walking with the electronic device 200 in a bag.

According to an embodiment, the processor 220 may match the output value with the corresponding user motion. For example, the processor 220 may store in the memory 230 by matching the level corresponding to the classification of the motion and may classify the operation according to the output value by matching the output value of the learned model with the level.

According to an embodiment, the processor 220 may identify real-time motion by analyzing motion data based on a signal measured in real time by the second sensor 260. For example, the processor 220 may collect a signal measured by the second sensor 260 in real time and input it into the learned model in real time and identify the user's motion over time.

Figure 5B:
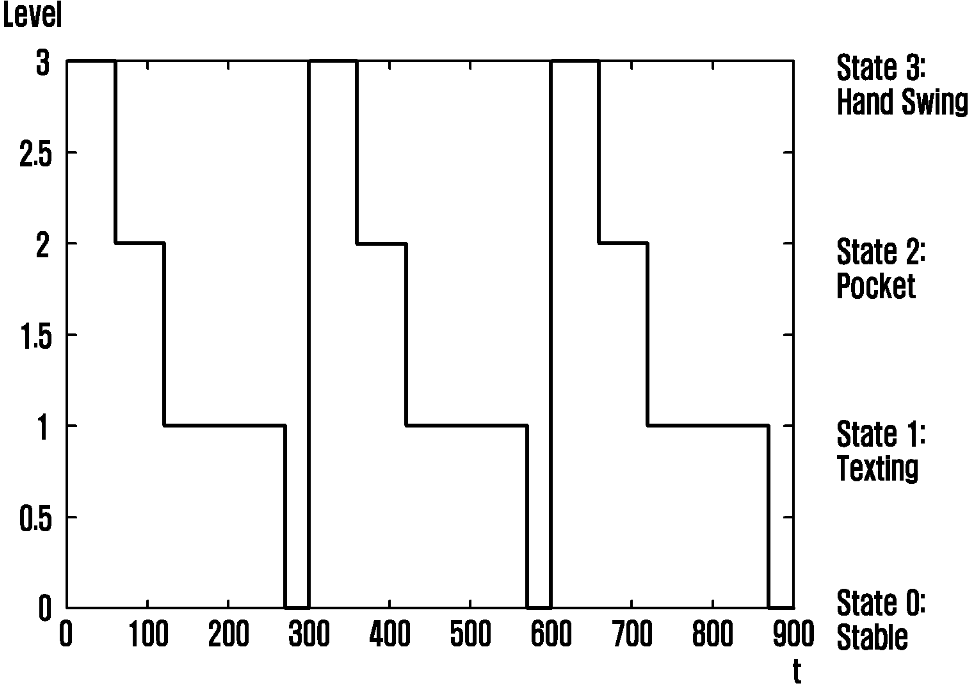
FIG. 5B is a diagram illustrating an example in which a processor identifies a motion of a user according to various example embodiments.

FIG. 5*b* is a diagram illustrating an example in which the processor 220 identifies the motion of a user according to various example embodiments.

According to the example of FIG. 5*b*, the x-axis of the graph may represent time, and the y-axis may represent the level of motion. The graph according to the example of FIG. 5*b* may be a graph showing the result of analyzing the motion of the user for 0~900 seconds.

According to an embodiment, the processor 220 may input motion data based on the signal measured by the second sensor 260 into the learned model and obtain an output value (e.g., operation 520 of FIG. 5*a*). For example, the output value obtained by the processor 220 may be the level of motion corresponding to the y-axis of the graph.

With reference to the graph of FIG. 5*b* according to an embodiment, level 3 was measured in the 0~60 second section, level 2 in the 60~120 second section, level 1 in the 120~270 second section, and level 0 in the 270~300 second section. In addition, level 3 was measured in the 300~360 second section, level 2 in the 360~420 second section, level 1 in the 420~570 second section, and level 0 in the 570~600 second section. In addition, level 3 was measured in the 600~660 second section, level 2 in the 660~720 second section, level 1 in the 720~870 second section, and level 0 in the 870~900 second section.

According to an embodiment, the processor 220 may identify the user's motion based on the obtained output value (e.g., operation 530 of FIG. 5*a*). For example, the processor 220 may classify the motion according to output values by matching motion level 0 with a stable state in which the user grips the electronic device 200 and does not move it, motion level 1 with a texting in which the user grips the electronic device 200 and sends a text message, motion level 2 with a pocket in which the user puts the electronic device 200 in a pocket and moves it, and motion level 3 with a hand swing in which the user grips the electronic device 200 in the hand and swings the arm.

For example, with reference to the graph of FIG. 5*b*, the processor 220 may identify the user's motion of each section as a hand swing in which a user grips the electronic device 200 and swings the arm in the range of 0~60 seconds, 300~360 seconds, and 600~660 seconds, a pocket in which the user puts the electronic device 200 in a pocket and moves it in the range of 60~120 seconds, 360~420 seconds, and 660~720 seconds, a texting in which the user grips the electronic device 200 and sends a text message in the range of 120~270 seconds, 420~570 seconds, and 720~870 seconds, and a stable state in which the user grips the electronic device 200 and does not move it in the range of 270~300 seconds, 570~600 seconds, and 870~900 seconds.

Figure 6:
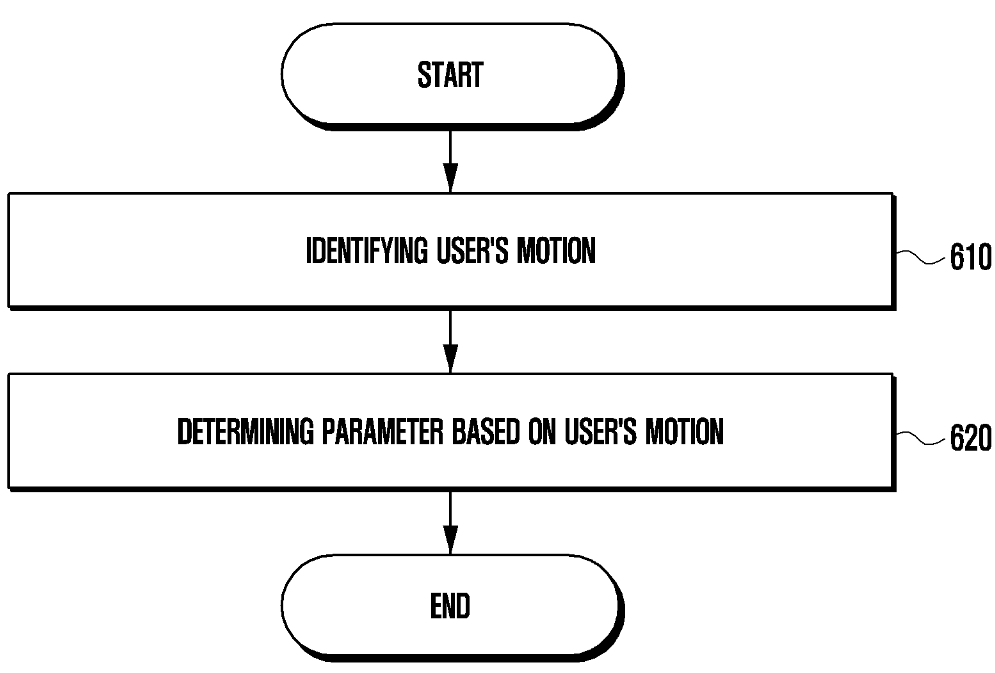
FIG. 6 is a flowchart illustrating a method for determining parameters according to the motion of a user by a processor according to various example embodiments.

FIG. 6 is a flowchart illustrating a method by which a processor (e.g., the processor 220 of FIG. 2) according to various example embodiments determines a parameter according to a user's motion.

According to various embodiments, the processor 220 may identify the user's motion in operation 610. According to an embodiment, the processor 220 may identify the user's motion according to operations 510 to 530 of FIG. 5*a*.

According to various embodiments, the processor 220 may determine a parameter to be used for calibration of the geomagnetic sensor 240 according to the user's motion in operation 620.

According to an embodiment, the processor 220 may determine a parameter to be used for calibrating a geomagnetic sensor (e.g., the geomagnetic sensor 240 of FIG. 2) based on the user's motion identified in operation 610. For example, the processor 220 may determine the parameters to be used for geomagnetic sensor 240 calibration differently depending on the motion (e.g., armswing motion while holding the electronic device, walking with the electronic device in the pocket of the pants).

According to various example embodiments, the parameter may be information for selecting data to be used for calibration of the geomagnetic sensor 240. According to an embodiment, the parameter may include a range of the strength of the signal identified based on the data to be used for calibration of the geomagnetic sensor 240.

According to an embodiment, the parameter may include a range of data to be used to calibrate the geomagnetic sensor 240 among data based on the signal measured by the geomagnetic sensor 240.

According to an embodiment, the signal measured by the geomagnetic sensor 240 may be expressed as each geomagnetic value of the three axes. For example, the signal measured by the geomagnetic sensor 240 may be expressed as x-axis geomagnetic value (Mx), y-axis geomagnetic value (My), z-axis geomagnetic value (Mz). When a set of data based on the signal measured by the geomagnetic sensor 240 is displayed on a three-dimensional coordinate system, it may be expressed in the form of a sphere. Since the geomagnetic sensor 240 may cause various errors when measuring the signal, the processor 220 may determine the range of data to be used for calibration of the geomagnetic sensor 240 among the data obtained by the geomagnetic sensor 240 to exclude the error data.

For geomagnetic data that may be expressed as (Mx, My, Mz), the magnitude of the geomagnetic data (strength of the geomagnetic signal) may be calculated using the equation of $$\sqrt{M_x^2 + M_y^2 + M_z^2}.$$

According to an embodiment, the processor 220 may calculate the size of the obtained geomagnetic data respectively, and the geomagnetic data within a specified range of the size of the calculated geomagnetic data may be used for calibration of the geomagnetic sensor 240.

According to an embodiment, the processor 220 may determine the data to be used for calibration of the geomagnetic sensor 240 according to the strength of the geomagnetic signal.

In general, the strength of the Earth's magnetic field, which is measured outdoors, may be measured differently depending on the region. For example, the strength of the Earth's magnetic field measured in Korea may be measured in about 50 μT (micro Tesla). On the other hand, the strength of the Earth's magnetic field measured indoors may be measured in the first range (e.g., about 30-80 μT) because of the occurrence of distortion. Therefore, in a general case, when the strength of the signal measured by the geomagnetic sensor 240 is in the first range (e.g., 30-80 μT), the data may be judged as data that can be used for calibration of the geomagnetic sensor 240.

According to an embodiment, the processor 220 may determine the range of strength of the geomagnetic signal corresponding to the data to be used for calibration of the geomagnetic sensor 240 according to the motion of the user.

For example, when the user grips the electronic device 200 and performs an armswing motion, the processor 220 may determine data corresponding to a geomagnetic signal having a strength of a second range (e.g., 40 μT to 70 μT) as data to be used for calibration of the geomagnetic sensor 240. As another example, when the user puts the electronic device 200 in his or her pants pocket and makes a walking motion, the processor 220 may determine the data corresponding to a geomagnetic signal having a third range (e.g., 20 μT to 80 μT) as data to be used for calibration of the geomagnetic sensor 240.

Figure 7A:
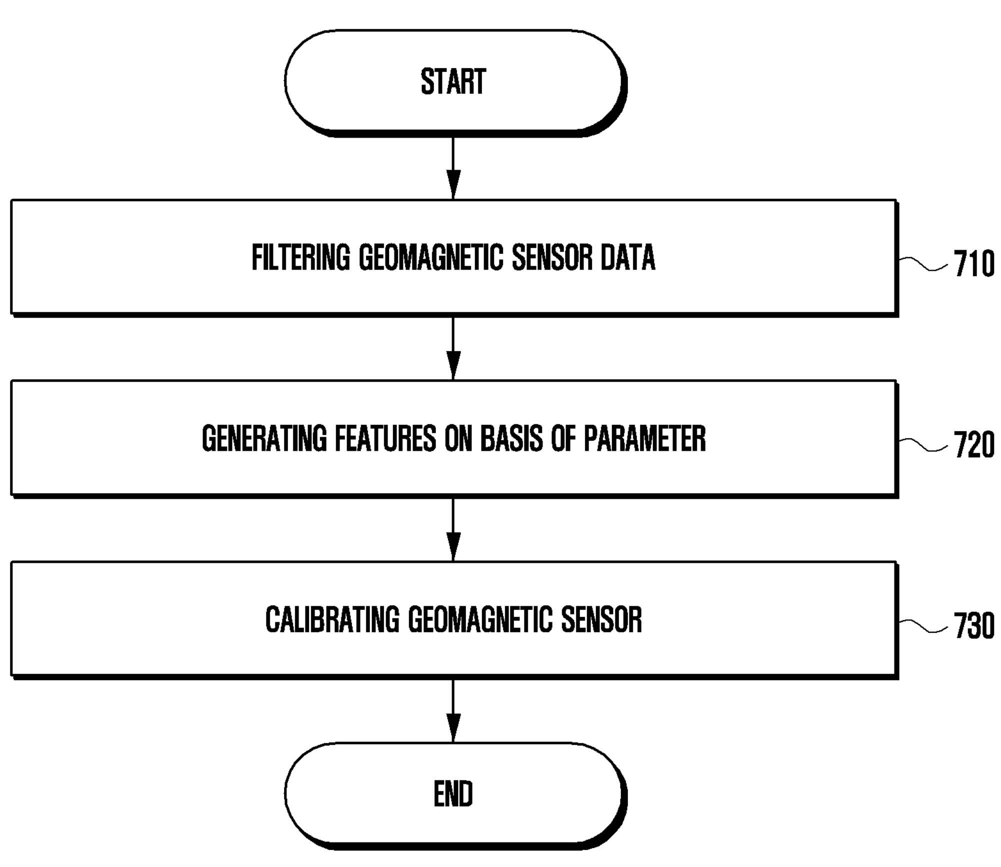
FIG. 7A is a flowchart illustrating a method of calibrating a geomagnetic sensor by a processor according to various example embodiments.

FIG. 7*a* is a flowchart illustrating a method in which a processor (e.g., the processor 220 of FIG. 2) calibrates a geomagnetic sensor (e.g., the geomagnetic sensor 240 of FIG. 2) according to various example embodiments.

According to various embodiments, the processor 220 may filter the geomagnetic data obtained through the geomagnetic sensor 240 in operation 710.

According to an embodiment, the processor 220 may process data by applying a filter (e.g., Kalman filter, a lowpass filter, and/or moving average) to the geomagnetic data obtained through the geomagnetic sensor 240.

According to an embodiment, the processor 220 may calculate the radius of the sphere in which the set of data is shaped to determine the reliability of the filtered data. For example, the processor 220 may arrange a set of filtered data on a three-dimensional coordinate system and calculate the radius of a sphere formed by the arranged data. According to an embodiment, the processor 220 may determine that the filtered data is unreliable if the radius of the sphere is greater than or equal to the first value and/or less than or equal to the second value.

According to an embodiment, the processor 220 may perform an operation to calibrate the geomagnetic sensor 240 using the filtered data in response to the determination that the filtered data is reliable.

According to various embodiments, the processor 220 may generate feature data based on geomagnetic data extracted based on the parameters determined in operation 720.

According to an embodiment, the processor 220 may determine the geomagnetic data to be used for calibration of the geomagnetic sensor 240 based on a parameter including the strength range of the geomagnetism. For example, the processor 220 may extract geomagnetic data of which the strength of the geomagnetic signal is included in a specified range, and it may use the extracted data for calibration of the geomagnetic sensor 240.

According to an embodiment, the processor 220 may generate feature data representative of the geomagnetic data measured by the geomagnetic sensor 240 using the extracted geomagnetic data based on the filtered data and the determined parameters. For example, the feature data may be data corresponding to the center point of the sphere when the geomagnetic data forms the shape of a sphere on a three-dimensional coordinate system. For example, the processor 220 may extract data within the range of the strength of the geomagnetic signal corresponding to the determined parameter from the filtered data. The processor 220 may arrange the extracted data on a three-dimensional coordinate system and generate the center points (x1, y1, z1) of the sphere formed by the arranged data as feature data.

According to various embodiments, the processor 220 may calibrate the geomagnetic sensor 240 in operation 730.

According to an embodiment, the processor 220 may calibrate the geomagnetic sensor 240 based on the feature data. For example, the processor 220 may calculate a calibration formula (e.g., x'=x−x0, y'=y−y0, z'=z−z0) to be (0, 0, 0) that can be expressed as (x0, y0, z0).

According to an embodiment, the processor 220 may calibrate the geomagnetic sensor 240 based on the calculated calibration formula. For example, the processor 220 may change the settings of the geomagnetic sensor 240 so that the geomagnetic sensor 240 outputs data based on the signal by applying a calculated calibration formula when measuring the geomagnetic signal.

Figure 7B:
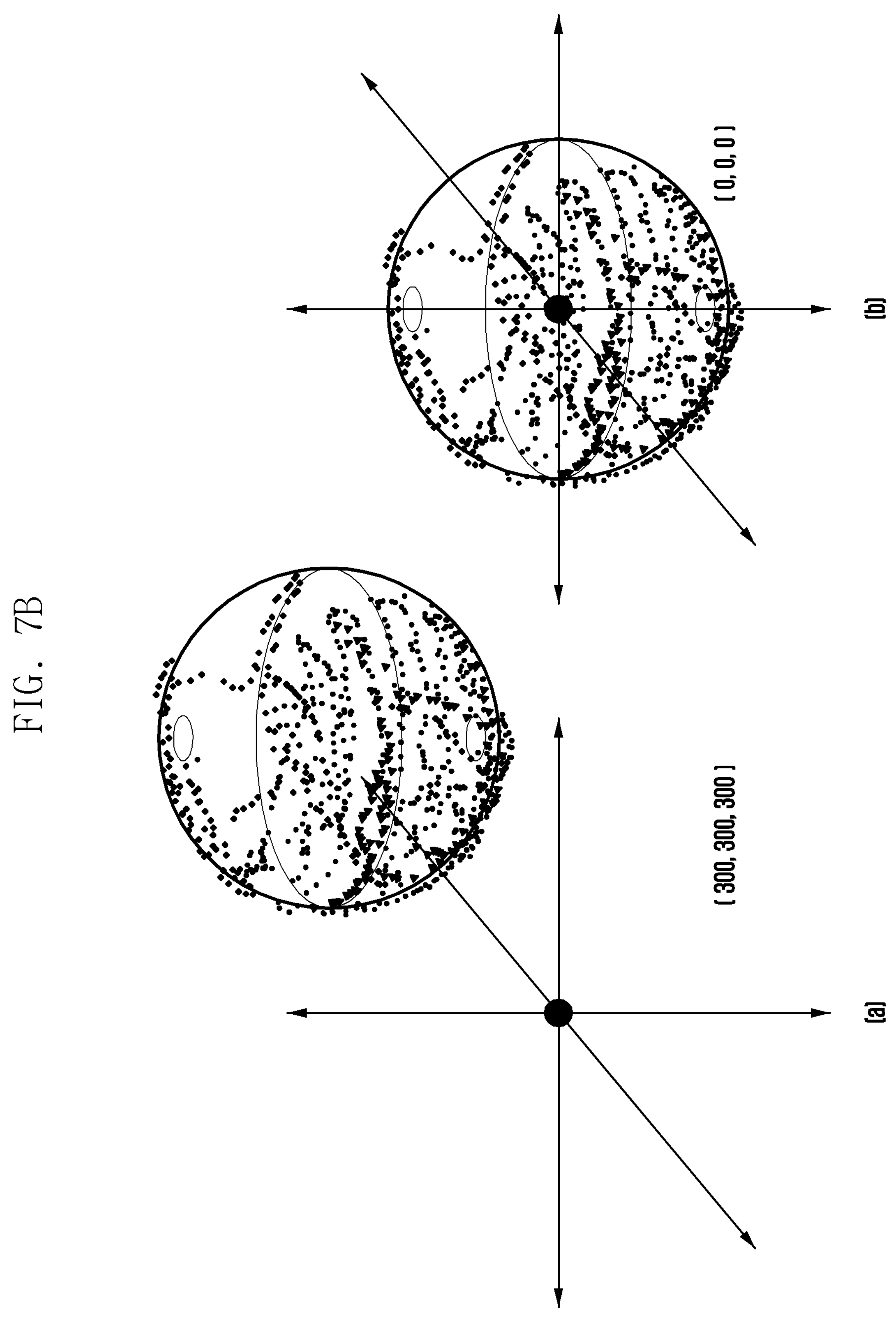
FIG. 7B is a diagram illustrating an example in which a processor calibrates a geomagnetic sensor according to various example embodiments.

FIG. 7*b* is a diagram illustrating an example in which the processor 220 calibrates the geomagnetic sensor 240 according to various example embodiments.

The processor 220 according to an embodiment may extract data by performing operations 710 and 720 of FIG. 7*a*, and the extracted data may be arranged on a three-dimensional coordinate system as shown in graph (a). With reference to graph (a), the extracted data may form the form of a sphere. The processor 220 may generate feature data by calculating the center points (300, 300, 300) of the sphere formed from the extracted data.

According to an embodiment, the processor 220 may perform operation 730 of FIG. 7*a* to calibrate the geomagnetic sensor 240. For example, processor 220 may calculate a calibration equation that causes the center point of a sphere formed by the extracted data, as shown in graph (b), to be (0, 0, 0). For example, to calibrate the data of the geomagnetic sensor 240 corresponding to graph (a), as shown in graph (b), an expression such as x'=x−300, y'=y−300, z'=z−300 may be calculated as a calibration formula.

According to an embodiment, the processor 220 may calibrate the geomagnetic sensor 240 based on the calculated calibration formula.

Figure 7C:
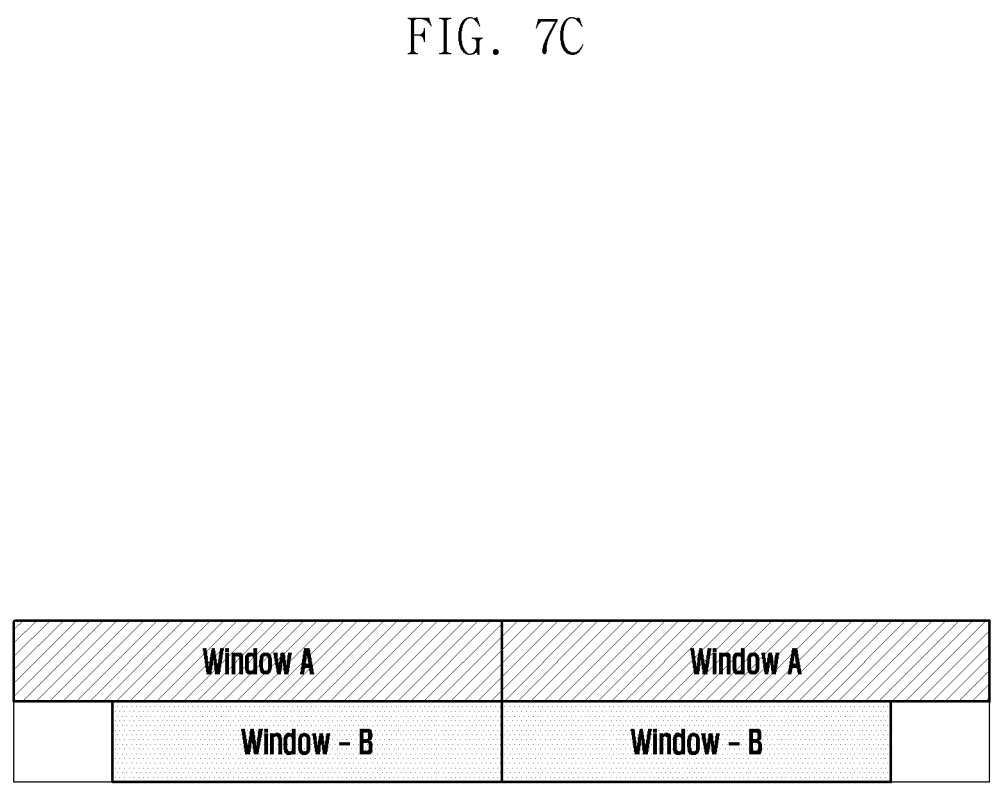

FIG. 7*c* is a diagram illustrating an example in which the processor 220 calibrates the geomagnetic sensor 240 according to various example embodiments.

According to various embodiments, the processor 220 may perform an operation to periodically and/or aperiodically calibrate the geomagnetic sensor 240 in response to satisfying the specified conditions. For example, the specified conditions may include whether the electronic device 200 is within the designated area and/or whether the processor 220 identifies the specified motion.

According to an embodiment, the processor 220 may initiate an operation to calibrate the geomagnetic sensor 240 when the specified motion is identified. When the specified motion is identified for a certain period of time from the time when the specified motion is identified, the processor 220 may perform an operation to calibrate the geomagnetic sensor 240 using the geomagnetic data of the corresponding section (window).

For example, when the first motion is identified for a specified time (window, e.g., window A) from the moment the first motion (e.g., armswing) is identified, the processor 220 may perform an operation to calibrate the geomagnetic sensor 240 using the geomagnetic data obtained through the geomagnetic sensor 240 for a time corresponding to the corresponding section (window A).

According to an embodiment, the windows may be in the form of a plurality, and the size or start time may be different depending on the type of window (e.g., window A, window B).

According to an embodiment, the processor 220 may classify the measured signals by time using a plurality of windows while the geomagnetic sensor 240 measures the signal. For example, while the geomagnetic sensor 240 is measuring a signal, the processor 220 may obtain the first geomagnetic data in the first window (e.g., window A) and then obtain the second geomagnetic data in the first window (e.g., window A) again. For another example, while the geomagnetic sensor 240 is measuring a signal, the processor 220 may obtain the first geomagnetic data in the first window (e.g., window A) and then obtain the second geomagnetic data in the second window (e.g., window B).

For example, the processor 220 may use the first geomagnetic data, use the second geomagnetic data, and/or calibrate the geomagnetic sensor 240 using data that combines the first and second geomagnetic data.

The electronic device according to various example embodiments may comprise: a geomagnetic sensor; a motion sensor for sensing a signal associated with a motion of a user; and a processor operatively connected, directly or indirectly, to the geomagnetic sensor and the motion sensor, wherein the processor determines whether to perform calibration of the geomagnetic sensor based on a signal measured by the geomagnetic sensor; in response to the determination to perform the calibration, identifies the motion of the user based on motion data obtained from the motion sensor; based on the identified motion of the user, determines a parameter including a range of data to be used for calibrating the geomagnetic sensor among data obtained from the geomagnetic sensor; and calibrates the geomagnetic sensor based on data extracted based on the parameter.

An electronic device according to various example embodiments may further include a first sensor for sensing a signal associated with a position of the electronic device and a memory for storing reference data that may indicate a feature of a designated area, wherein the processor determines whether the electronic device is within a designated area based on the result of comparing the reference data stored in the memory with the data based on the signal measured by the first sensor and calibrates the geomagnetic sensor in response to the electronic device being in the designated area.

In an electronic device according to various example embodiments, the processor may determine that the electronic device is in a designated area in response to the fact that the degree of agreement comparing the reference data with the data based on the signal measured by the first sensor is greater than or equal to a specified value, and it may determine to perform calibration of the geomagnetic sensor in response to the fact that the strength of the signal measured by the geomagnetic sensor is greater than or equal to the specified value.

In an electronic device according to various example embodiments, a memory for storing a model learned with a motion data set is further comprised, wherein the processor inputs the motion data obtained from the motion sensor to the learned model stored in the memory.

In an electronic device according to various example embodiments, the processor may determine the parameter including a range of the size of the geomagnetic data according to the motion of the identified user, calculate the size of the data obtained from the geomagnetic sensor, extract data in which the size of the data is included in the range, and calibrate the geomagnetic sensor based on the extracted data.

In an electronic device according to various example embodiments, the processor may determine the range of data to be used as the first range in response to the motion of the identified user as the first motion, and the motion of the identified user is the first motion.

In an electronic device according to various example embodiments, the processor may filter the data obtained from the geomagnetic sensor and calibrate the geomagnetic sensor using the filtered data.

In an electronic device according to various example embodiments, the processor may calculate the center point and radius of the sphere formed by the extracted data on a three-dimensional coordinate system and calibrate the geomagnetic sensor based on a calibration equation so that the center point becomes (0, 0, 0).

In an electronic device according to various example embodiments, the processor may initiate an operation to calibrate the geomagnetic sensor in response to identifying the motion of the user.

In an electronic device according to various example embodiments, the processor may separately obtain signals of the first and/or second sections in time among the signals measured by the geomagnetic sensor and calibrate the geomagnetic sensor based on the data included in the first section.

The operation method of the electronic device according to the various example embodiments may comprise: determining whether to perform calibration of the geomagnetic sensor based on the signal measured by the geomagnetic sensor; identifying the user's motion based on the motion data obtained from the motion sensor in response to the determination to perform the calibration; determining a parameter including a range of data to be used to calibrate the geomagnetic sensor among the data obtained from the geomagnetic sensor based on the motion of the identified user; and calibrating the geomagnetic sensor based on the data extracted based on the parameters.

In the operation method of the electronic device according to various example embodiments, determining whether the electronic device is in the designated area based on a result of comparing reference data indicating the features of the designated area stored in a memory with signal-based data related to the position of the electronic device measured by a first sensor and, in response to the electronic device being in the designated area, calibrating the geomagnetic sensor may be further included.

In the operation method of the electronic device according to various example embodiments, identifying that the electronic device is in a designated area in response to the fact that the degree of agreement comparing the reference data with the data based on the signal measured by the first sensor is greater than or equal to a specified value and determining that the geomagnetic sensor will perform calibration of the geomagnetic sensor in response to the strength of the signal measured by the geomagnetic sensor is greater than or equal to a specified value may be included.

In the operation method of the electronic device according to various example embodiments, identifying the motion of the user by inputting the motion data obtained from the motion sensor into the model learned as a motion data set may be included.

In the operation method of an electronic device according to various example embodiments, determining the parameter including a range of magnitude of geomagnetic data according to the motion of the identified user, calculating the size of the data obtained from the geomagnetic sensor, extracting data whose size is included within the range, and calibrating the geomagnetic sensor based on the extracted data may be included.

In the operation method of the electronic device according to various example embodiments, determining the range of the data to be used as the first range in response to the face that the motion of the identified user is the first motion and determining the range of data to be used as a second range in response to the fact that the motion of the identified user is the first motion may be included.

In the operation method of an electronic device according to various example embodiments, filtering data obtained from the geomagnetic sensor and calibrating the geomagnetic sensor using the filtered data may be included.

In the operation method of an electronic device according to various example embodiments, calculating the center point and radius of a sphere formed by the extracted data on a three-dimensional coordinate system and calibrating the geomagnetic sensor based on a calibration formula for the center point to be (0, 0, 0) may be included. "Based on" as used herein covers based at least on.

In the operation method of the electronic device according to various example embodiments, in response to identifying the motion of the user, calibrating the geomagnetic sensor may be further included.

In the operation method of an electronic device according to various example embodiments, obtaining a signal measured by the geomagnetic sensor by dividing it into a first and/or second section in time and, based on the data included in the first section, calibrating the geomagnetic sensor may be further included.

The various embodiments of this document and the terms used therein are not intended to limit the technical features described in this document to specific embodiments, but should be understood to include various modifications, equivalents, or substitutes of such embodiments.

In connection with the description of the drawings, similar reference marks may be used for similar or related components. The singular form of a noun corresponding to an item may include one or a plurality of the item, unless the relevant context clearly indicates otherwise.

In this document, each of the phrases "A or B", "at least one of A and B", "at least one of B", "A, B or C", "at least one of A, B and C", and "at least one of B or C" may include any one of the items listed together in the corresponding phrase of the phrase, or any possible combination thereof. Terms such as "first", "second", or "first" or "second" may be used simply to distinguish a component from other such components, and do not limit the components in other aspects (e.g., importance or order). When a (e.g., a first) component is referred to in another (e.g., second) component as "coupled" or "connected" with or without the terms "functionally" or "communicatively", it means that the component may be connected to the other component directly (e.g., by wire), wirelessly, or via at least a third component(s).

In addition, the example embodiments disclosed in this specification and drawings are merely specific examples to easily explain the technical contents according to the example embodiments and to facilitate the understanding of the example embodiments, and are not intended to limit the scope of the example embodiments. Therefore, the scope of the various example embodiments should be construed as including all altered or modified forms derived based on the technical ideas of the various example embodiments, in addition to the example embodiments, to include the scope of the various example embodiments.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment (s) described herein may be used in conjunction with any other embodiment(s) described herein.

The invention claimed is:

1. An electronic device comprising:

a geomagnetic sensor;

memory configured to store a plurality of instructions;

a motion sensor; and at least one processor operatively connected to the geomagnetic sensor and the motion sensor, wherein the plurality of instructions, when executed by the at least one processor individually or collectively, cause the electronic device to:

obtain a plurality of geomagnetic signals from the geomagnetic sensor;

determine to perform calibration of the geomagnetic sensor when a magnitude of a geomagnetic signal among the plurality of geomagnetic signals exceeds a preset value;

based on determining to perform the calibration, identify a motion of a user based on motion data obtained using the motion sensor;

based on the identified motion of the user, determine a range of magnitude to be used for calibrating the geomagnetic sensor;

extract geomagnetic data corresponding to geomagnetic signal having a magnitude within the determined range of magnitude among the geomagnetic signals; and calibrate the geomagnetic sensor based on the extracted geomagnetic data.

2. The electronic device of claim 1, further comprising a first sensor for sensing a signal associated with a location of the electronic device, and wherein the memory is configure to store reference data capable of representing features of a designated area, wherein the plurality of instructions, when executed by the at least one processor individually or collectively, cause the electronic device to:

determine whether the electronic device is within a designated area based on a result of comparing reference data stored in the memory with data based on a signal measured by the first sensor, and calibrate the geomagnetic sensor in response to the electronic device being in the designated area.

3. The electronic device of claim 2, wherein the plurality of instructions, when executed by the at least one processor individually or collectively, cause the electronic device to:

determine that the electronic device is in a designated area in response to the fact that a level of agreement comparing the reference data with the data based on the signal measured by the first sensor is greater than or equal to a specified level, and determine to perform calibration of the geomagnetic sensor in response to the fact that the strength of the signal measured by the geomagnetic sensor is greater than or equal to a specified strength.

4. The electronic device of claim 1, further comprising a memory for storing a model learned as a motion data set, wherein the plurality of instructions, when executed by the at least one processor individually or collectively, cause the electronic device to:

identify a user's motion at least by inputting motion data obtained from the motion sensor into the learned model stored in the memory.

5. The electronic device of claim 1, wherein the plurality of instructions, when executed by the at least one processor individually or collectively, cause the electronic device to:

determine a size range of the geomagnetic data to be used as a first range based on the identified motion of the user being a first motion, and determine a size range of the geomagnetic data to be used as a second range based on the identified motion of the user being a second motion.

6. The electronic device of claim 1, wherein the plurality of instructions, when executed by the at least one processor individually or collectively, cause the electronic device to:

filter data obtained using the geomagnetic sensor, and calibrate the geomagnetic sensor using at least the filtered data.

7. The electronic device of claim 1, wherein the plurality of instructions, when executed by the at least one processor individually or collectively, cause the electronic device to:

calculate a center point and radius of a sphere formed by the extracted data on a three-dimensional coordinate system, and calibrate the geomagnetic sensor based on a calibration equation so that the center point becomes (0, 0, 0).

8. The electronic device of claim 1, wherein the plurality of instructions, when executed by the at least one processor individually or collectively, cause the electronic device to:

based on identifying the user's motion, initiate an operation to calibrate the geomagnetic sensor.

9. The electronic device of claim 1, wherein the plurality of instructions, when executed by the at least one processor individually or collectively, cause the electronic device to:

among the geomagnetic data, obtain the geomagnetic data of a first section and/or a second section separately in time, and calibrate the geomagnetic sensor based on the geomagnetic data included in the first section.

10. A method for an electronic device, the method comprising:

obtaining a plurality of geomagnetic signals from a geomagnetic sensor;

determining to perform calibration of a geomagnetic sensor based on when a magnitude of a geomagnetic signal among the plurality of geomagnetic signals exceeds a preset value;

identifying a user's motion based on motion data obtained using a motion sensor based on determining to perform the calibration;

determining a range of magnitude to be used for calibrating the geomagnetic sensor based on the identified user's motion;

extract geomagnetic data corresponding to geomagnetic signal having a magnitude within the determined range of magnitude among the geomagnetic signals; and calibrate the geomagnetic sensor based on the extracted geomagnetic data.

11. The method of claim 10, further comprising:

determining whether the electronic device is in a designated area based on a result of comparing reference data indicating features of the designated area stored in a memory with signal-based data related to a position of the electronic device measured by a first sensor; and, in response to the electronic device being in the designated area, calibrating the geomagnetic sensor.

12. The method of claim 11, comprising:

determining that the electronic device is in the designated area in response to a level of agreement comparing the reference data and data based on the signal measured by the first sensor is greater than or equal to a specified level; and determining to perform calibration of the geomagnetic sensor based on strength of the signal measured by the geomagnetic sensor being greater than or equal to a specified level.

13. The method of claim 10, comprising identifying a user's motion at least by inputting the motion data obtained from the motion sensor into a model learned as a motion data set.

* * * * *